United States Patent
Tong et al.

(10) Patent No.: US 11,556,485 B1
(45) Date of Patent: Jan. 17, 2023

(54) PROCESSOR WITH REDUCED INTERRUPT LATENCY

(71) Applicant: Apple Inc., Cupertino, CA (US)

(72) Inventors: Jonathan Ying Fai Tong, Austin, TX (US); Brett S. Feero, Lake Oswego, OR (US); Christopher L. Colletti, Austin, TX (US); David Edward Kroesche, Austin, TX (US); Gagan Anand, Austin, TX (US); Matthew C. Stone, Austin, TX (US); So Min Song, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/462,416

(22) Filed: Aug. 31, 2021

(51) Int. Cl.
*G06F 13/24* (2006.01)
*G06F 12/0879* (2016.01)

(52) U.S. Cl.
CPC .......... *G06F 13/24* (2013.01); *G06F 12/0879* (2013.01); *G06F 2212/603* (2013.01)

(58) Field of Classification Search
None
See application file for complete search history.

(56) References Cited

U.S. PATENT DOCUMENTS

| | | | |
|---|---|---|---|
| 6,148,361 A | 11/2000 | Carpenter et al. | |
| 6,243,804 B1 | 6/2001 | Cheng | |
| 6,615,281 B1* | 9/2003 | Temple, III | G06F 9/4825 713/502 |
| 6,721,878 B1* | 4/2004 | Paul | G06F 13/24 710/260 |
| 6,799,269 B2 | 9/2004 | Dowling | |
| 9,829,966 B2 | 11/2017 | Gulati et al. | |
| 2002/0046334 A1* | 4/2002 | Wah Chan | G06F 9/3004 710/200 |
| 2005/0262301 A1* | 11/2005 | Jacobson | G06F 9/3834 711/E12.039 |
| 2006/0161727 A1* | 7/2006 | Surico | G06F 12/0246 711/E12.008 |

* cited by examiner

*Primary Examiner* — Elias Mamo
(74) *Attorney, Agent, or Firm* — Kowert, Hood, Munyon, Rankin & Goetzel, P.C.; Erik A. Heter; Dean M. Munyon

(57) ABSTRACT

A processor with reduced interrupt latency is disclosed. An apparatus includes a processor core and a cache subsystem having a cache controller and a cache. The processor core is configured to submit, to the cache controller, requests for access to the cache, wherein a given request for access to the cache specifies whether the given request is abandonable or non-abandonable in an event of an interrupt request. In response to a particular interrupt request, the processor core may provide an indication to cause the cache controller to abandon requests for access to the cache identified as abandonable. After receiving an acknowledgement from the cache controller that the abandonable requests have been abandoned, the processor core may begin execution of an interrupt handler in order to service the interrupt request.

20 Claims, 9 Drawing Sheets

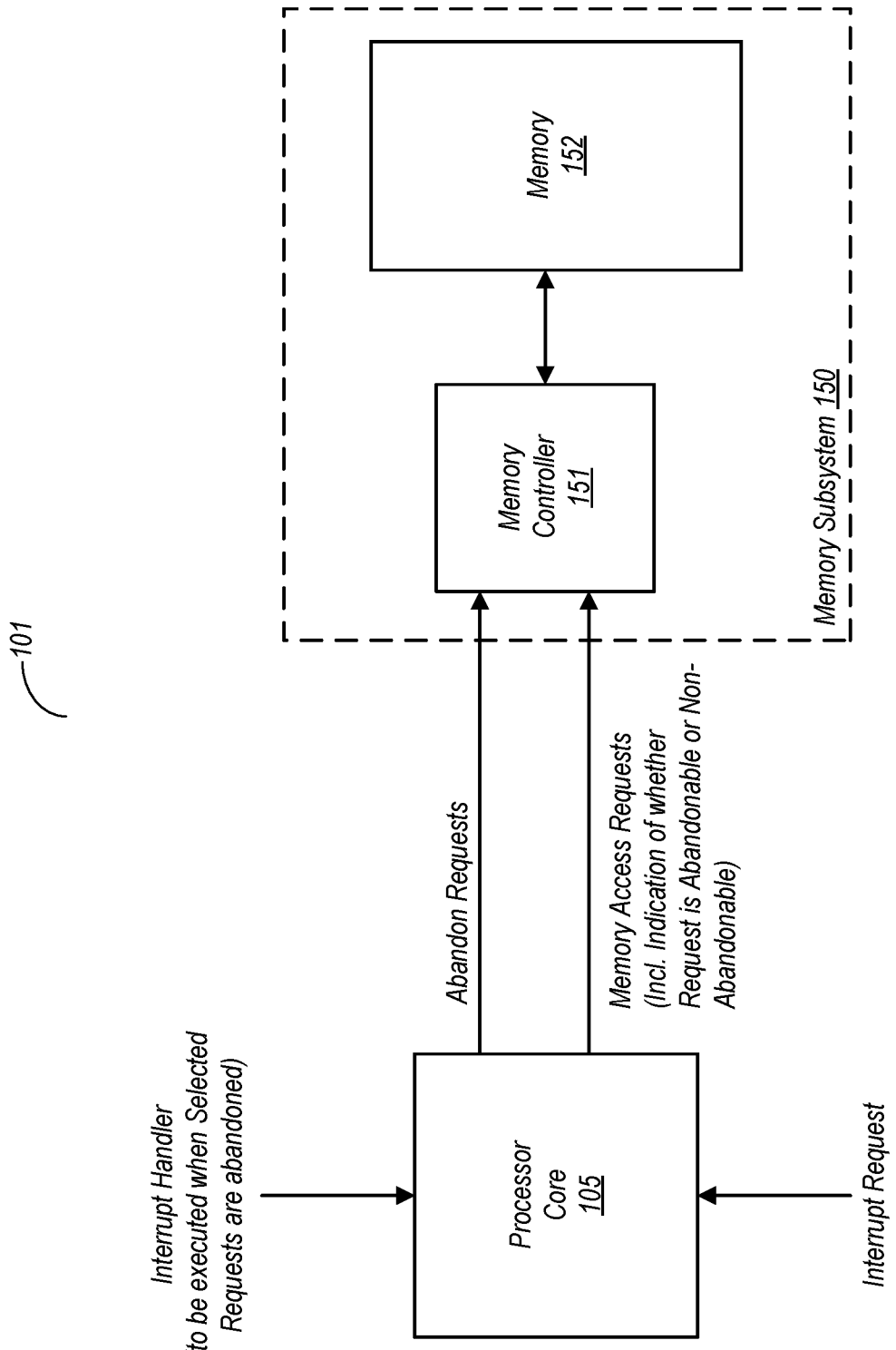

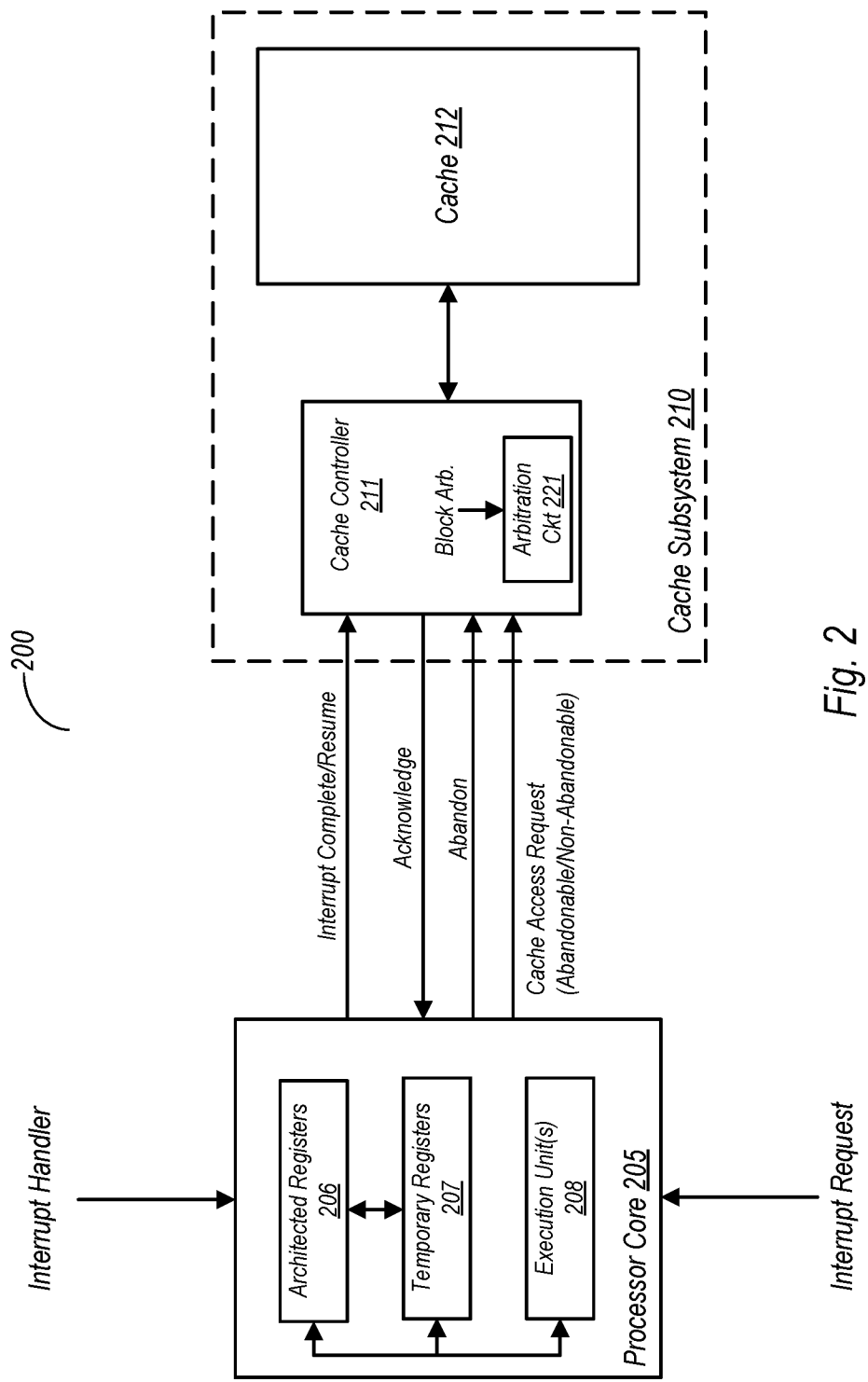

PROCESSOR WITH REDUCED INTERRUPT LATENCY

BACKGROUND

Technical Field

This disclosure is directed to computer systems, and more particularly, to interrupts to processors in computer systems.

Description of the Related Art

During operation of computer systems, interrupt requests may be sent to a processor in response to a particular event. Interrupt requests may be generated by hardware or software. For example, a hardware peripheral device such as a keyboard may generate an interrupt request, in response to user input, for an event that needs attention within a specified latency. When a processor receives an interrupt request, it may suspend execution of current instruction streams and execute what is known as an interrupt handler in order to service the request.

In some instances, a processor core may complete certain operations before beginning servicing of an interrupt. For example, a processor may complete execution of instructions that change the architectural state of the processor before the interrupt is serviced. Similarly, cache access and/or memory requests that were pending at the time an interrupt was received may also be completed.

After completing the servicing of the interrupt request, the processor core may resume operations, and this can include resuming operations from the point at which the interrupt request was initially received.

SUMMARY

A processor with reduced interrupt latency is disclosed. In one embodiment, an apparatus includes a processor core and a cache subsystem having a cache controller and a cache. The processor core is configured to submit, to the cache controller, requests for access to the cache, wherein a given request for access to the cache specifies whether the given request is abandonable or non-abandonable in an event of an interrupt request. In response to a particular interrupt request, the processor core may provide an indication to cause the cache controller to abandon requests for access to the cache identified as abandonable. After receiving an acknowledgement from the cache controller that the abandonable requests have been marked as abandoned, the processor core may begin execution of an interrupt handler in order to service the interrupt request.

In providing an indication distinguishing abandonable cache access requests, the latency for processing the particular interrupt request as a result of the abandonment of those requests may be reduced. Furthermore, abandoning those requests indicated as abandonable may also free up cache resources for use during the processing of the interrupt requests. Various embodiments may also carry out similar operation with regard to a memory subsystem including a memory controller and a memory.

Embodiments are also possible and contemplated in which instructions that alter the architectural state of the processor include an interruptible window and a subsequent non-interruptible window. During execution of instructions during the interruptible window, results may be stored in temporary (non-architected) registers. During the non-interruptible window, results from the instructions may be transferred from the temporary registers to architected registers. If an interrupt request is received during the interruptible window, execution of the instruction may be suspended, with execution resumed once servicing of the interrupt is complete. The utilization of the temporary registers and the interruptible window may help reduce the latency of interrupt handling by preventing instructions that change the architectural state of the processor from delaying the onset of interrupt handling.

BRIEF DESCRIPTION OF THE DRAWINGS

The following detailed description makes reference to the accompanying drawings, which are now briefly described.

FIG. 1B is a block diagram of one embodiment of a computer system having a processor core and a memory subsystem.

FIG. 2 is a block diagram of another embodiment of a computer system having a processor core and cache subsystem.

DETAILED DESCRIPTION OF EMBODIMENTS

Figure 1A:
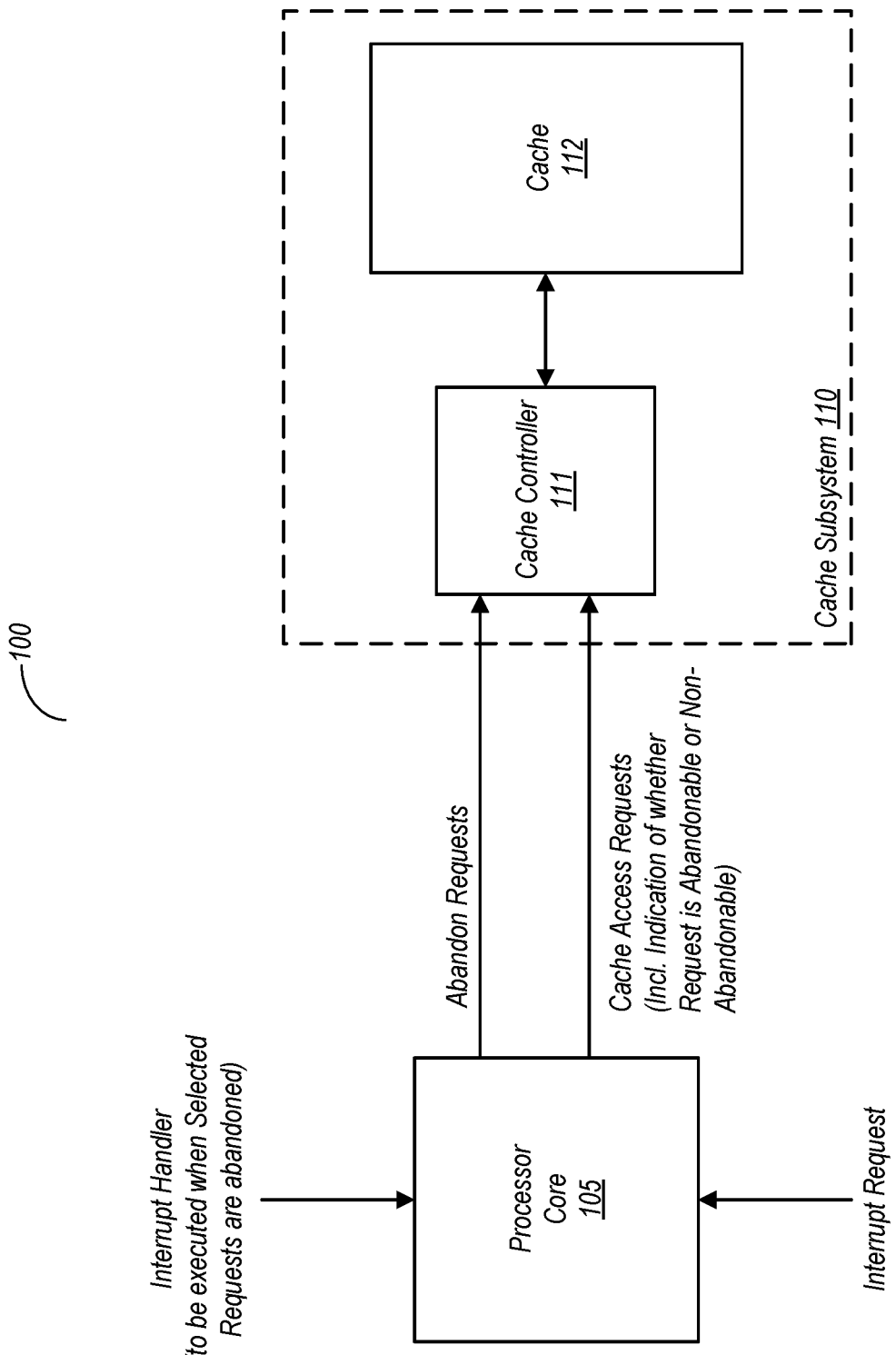
FIG. 1A is a block diagram of one embodiment of a computer system having a processor core and a cache subsystem.

The present disclosure is directed to various mechanisms for reducing interrupt handling latency in a processor. Handling interrupt requests within a given latency is important in processors. Delays in handling interrupts can result in performance losses, as well as failure to meet quality of service parameters for some transactions on a processor or system-on-a-chip. However, the servicing of interrupts can be delayed by various factors.

One factor that can delay the servicing of an interrupt request by a processor (or processor core) is the various cache access requests that have been submitted to a cache subsystem. During operation, a processor core may, for example, submit cache access requests to retrieve instructions and data for subsequent execution, as well as for completing the execution of certain instructions. When an interrupt request is received, the processor core may temporarily cease submitting cache access requests. However, the cache subsystem may continue processing pending access requests. This can delay the beginning of interrupt handling. Furthermore, cache subsystem resources that may be used in the handling of at least some interrupts may continue to be occupied.

The present disclosure makes use of the insight that some cache access requests can be abandoned without adversely affecting system operation. For example, prefetches and cache access requests corresponding to instructions to be speculatively executed may be dropped, as their abandonment does not affect the architectural state of the processor or memory coherency. Accordingly, the present disclosure is directed to embodiments of a system in which a processor core identifies cache access requests as being abandonable or non-abandonable. Upon receiving an interrupt request, the processor core may send an indication to a cache controller of a cache subsystem to abandon those requests that are designated as abandonable. The cache controller may respond by abandoning those requests and providing an acknowledgment that the requests have been marked as abandoned, to the processor core. Thereafter, the processor core may begin execution of an interrupt handler to service the interrupt request.

Another factor that can delay the onset of interrupt servicing by a processor core is the execution of instructions that alter the core's architectural state by writing results to architected registers. During the execution of such instructions, the generation of results that are to be written to architected registers prevents the beginning of execution of an interrupt handler until the instruction is retired. The generation of these results may occur at various points during the execution of an instruction. Furthermore, these instructions may include a number of operations, sometimes referred to as micro-ops. The content of the memory that is globally observable may also be considered. If a particular instruction has modified globally observable memory, an interrupt received during its execution may be blocked until such time that the instruction completes execution, e.g., to prevent a partial store. Accordingly, if an instruction that alters the architectural state of the processor is executing at the time an interrupt request is received, the servicing of the interrupt may be delayed until such time that the instruction is retired.

The present disclosure makes use of the insight that temporary registers can be used to reduce a non-interruptible window of an instruction to a small amount occurring near its end. Accordingly, instructions that alter the architectural state of the processor core may be divided in time by a first, interruptible window followed by a second non-interruptible window. When results that would alter the architectural state of the processor core are generated during the interruptible window, they may initially be written to temporary registers. These temporary registers are not architected registers, and are thus not visible to software from which the corresponding instructions originate. The results may then be transferred into architected registers during the non-interruptible window. This non-interruptible window may be relatively short compared to the interruptible window, and may occur at the end of the instruction. If an interrupt occurs during the interruptible window, execution of the instruction can be suspended while any generated results remain stored in the temporary registers. Upon resuming execution of the instruction, the results can be stored in the architected registers upon commencement of the non-interruptible window. Furthermore, since the non-interruptible window may be relatively short, an interrupt request arriving during this time may not unduly delay the beginning of interrupt handling. The temporary registers may also be used to provide temporary storage for instructions that may modify memory (e.g., with store operations in a load/store architecture). For an instruction having a number of microcode operations that include one or more store operations, the store operations may be grouped and placed at the end of the microcode operations. This may reduce the non-interruptible window to a portion of the instruction in which the one or more store operations are carried out. Additionally, where multiple store operations are part of an instruction, the disclosure contemplates bounding the time to complete the various ones of the store operations to minimize the non-interruptible window. This can include resolving any resource dependencies and resolving potential hazards before the first store operation commits results to memory (at which time, the interruptible window of the instruction closes).

The mechanisms discussed above may be combined in at least some embodiments. Accordingly, the disclosure contemplates a system in which a processor/processor core executes instructions having interruptible and non-interruptible windows while also designating cache access requests originating therein as being abandonable or non-abandonable. Temporary registers are provided in such embodiments for the initial storing of results generated by instructions, with the architectural state of the system remaining unchanged until the instruction reaches the non-interruptible window. The two mechanisms described herein may also operate concurrently with one another. For example, if an interrupt request is received during the interruptible window of an executing instruction, the processor core may suspend execution of the instruction while concurrently generating the indication to abandon any pending cache access requests designated as abandonable. Additionally, a cache subsystem in various embodiments of this disclosure may block arbitration of any incoming cache access requests in response to receiving the indication from the processor core for at least a portion of the time until the interrupt has been fully serviced and normal, non-interrupt operations have resumed. For example, arbitration may be blocked for a fixed window of time after the indication is received. After the fixed window of time has expired, arbitration may resume even if the interrupt servicing is not fully complete. This may allow the use of arbitration in instances where it is a necessary function of servicing the interrupt.

The description below begins with discussion of various embodiments of a computer system having a processor core and a cache subsystem. An embodiment of a request format is then described, followed by discussion of an instruction format with respect to time, including interruptible and non-interruptible windows or intervals. Various methods of operating computer systems with the mechanisms disclosed herein are then discussed. The description concludes with a discussion of an example system.

Computer System with Processor and Cache Subsystem:

FIG. 1A is a block diagram of one embodiment of a system 100 including a processor core 105 and a cache subsystem 110. Cache subsystem 110 in the embodiment shown includes a cache controller 111 and a cache 112. The cache 112 may be any type of cache, such as a fully associative cache, set associative cache, or a direct mapped cache.

Processor core 105 in the embodiment shown may include various circuits (not shown here) such as registers, execution units, control units, and so on. The processor core may, in some embodiments, be one of a number of processor cores in a multi-core processor or system-on-a-chip (SoC), but may also be the sole core of a single-core processor in other embodiments. Generally speaking, processor core 105 may be any type of processing element that executes instructions. Furthermore, processor core 105 may be any type of processing element capable of submitting access requests to a cache subsystem.

In the embodiment shown, cache access requests submitted by processor core 105 are designated as either abandonable or non-abandonable. A request may be designated as abandonable if dropping the request before completion has no effect on functional correctness of the software executing on the system. Various types of requests may be designated as abandonable. For example, a cache access request associated with certain prefetches may be designated as abandonable, as such prefetches are speculative at the time of access. Furthermore, cache access requests associated with speculative instructions (e.g., based on a branch prediction) may also be abandoned, due to their speculative nature. Cache access requests for fetching instructions to be executed (e.g., by an instruction fetch unit) may also be abandonable. Hardware table walks are another class of cache access requests that may be abandonable. Requests that cannot be abandoned may generally be those requests upon which functional correctness is dependent. For example, a cache access request associated with a retired instruction may be considered non-abandonable. A cache access request upon which memory coherency is dependent may also be classified as non-abandonable. Cache access requests corresponding to device access requests that have side effects are another type of request that may be classified as non-abandonable.

Processor core 105 in the embodiment shown is configured to process interrupts, and is thus arranged to receive interrupt requests. In response to receiving an interrupt request, processor core 105 in the illustrated embodiment may convey a signal to cache controller 111 to abandon those pending requests that were designated as abandonable. In response to receiving the indication, cache controller 111 may cause the pending requests designated as abandonable to be abandoned. By abandoning these requests, cache controller 111 may free up resources for use by an interrupt handler to be executed by processor core 105 in service of the interrupt request. Non-abandonable requests may be completed by cache subsystem 110. In at least some instances, it is possible for interrupt servicing to begin before non-abandonable requests have been completed. However, the abandoning of requests designated as abandonable may nevertheless reduce the amount of time cache access requests are being processed by cache controller 111 between the time the interrupt request was received and the interrupt handler begins execution. This in turn can reduce the latency of interrupt handling in system 100.

Subsequent to completing the abandoning of those requests designated as abandonable, processor core 105 may execute an interrupt handler to service the interrupt. For example, an interrupt may be generated by a request to display data to a user of a computer system. Accordingly, handling of the interrupt may include accessing and displaying the requested data. Irrespective of the interrupt type, once the interrupt handler has completed executing, processor core 105 may cause a resumption of execution of the program/thread that was executing prior to the interrupt request being received.

It is noted that the operation described above (as well as that to be described below) may apply to any type of interrupt including polled interrupts, vectored interrupts, hardware-generated interrupts, and software-generated interrupts.

FIG. 1B is a block diagram of one embodiment of a system having a processor core and a memory subsystem. In the embodiment shown, system 101 includes a processor core 105 coupled to a memory subsystem 150. The memory subsystem 150 includes a memory controller 151 and a system memory 152. Similar to the embodiment discussed above in reference to FIG. 1A, memory requests initiated by processor core 105 may be marked ad abandonable or non-abandonable. When an interrupt request is received by processor core 105, it may respond by providing an indication to memory controller 151 to abandon those requests that have been marked as such. In response, memory controller 151 may abandon those requests that have been marked as abandonable, while carrying out those requests that are non-abandonable. The memory controller 151 may also provide an acknowledgment signal to processor core 105 when the marking of requests as abandoned is complete.

The abandonable requests to memory may include those that are non-cacheable, and may also include other types as well. For example, speculative memory requests and prefetches may be among the types of requests that can be abandoned. Some abandonable requests may also be those that were initially made in response to a cache miss. Requests that cannot be abandoned may include writes to memory that are to be globally observable and alter the architectural state of the system.

Generally speaking the operation of various embodiments of the system as described herein with respect to a cache subsystem in the context of interrupts may also apply to memory subsystems. Accordingly, in the subsequent figures and the various discussions, "memory subsystem" may be substituted for "cache subsystem," "memory controller" may be substituted for "cache controller," "memory" may be substituted for "cache memory," and "memory request" may be substituted for "cache access request." One of skill in the art will recognize that although certain aspects of cache subsystem operation differs from that of memory subsystem operation, various ones of the techniques to reduce interrupt latency disclosed herein may be similarly applied to memory subsystems, particularly in designating requests as abandonable or non-abandonable and treating them as such in response to an interrupt request.

FIG. 2 is a block diagram of another embodiment of a system that includes a processor core and a cache subsystem. In the embodiment shown, processor core 205 is coupled to cache subsystem 210. Processor core 205 in the embodiment shown may be one of a number processor cores in a multi-core processing system. Cache subsystem 210 in the embodiment shown may be one of a number of different levels of cache memory, e.g., Level 1 (L1), Level 2 (L2), and so on. In various embodiments, processor core 205 and cache subsystem 210 may be part of a system-on-a-chip (SoC) that include other components not shown here.

Processor core 205 in the embodiment shown includes architected registers 206, temporary registers 207, and execution units 208. The execution units 208 may be configured to execute various types of instructions using operands in various formats. For example, execution unit(s) 208 may include a floating point execution unit, a fixed point execution unit, and an integer execution unit. Execution units suitable for vector and/or matrix instructions are also possible and contemplated.

Temporary registers 207 in the embodiment shown may provide temporary storage to results generated from the execution of an instruction. These results may be invisible to software executing on the system during an interruptible time window of an instruction, which will be discussed in further detail below. Furthermore, results stored in temporary registers 207 do not alter the architectural state of processor core 205 or the system (e.g., globally observable memory) in which it is implemented. Architected registers 206 in the embodiment shown are registers specified by an instruction set architecture (ISA) of processor core 205. When results of instructions are stored in these registers, the architectural state of processor core 205 is altered. After instruction results are committed to architected registers 206, the instruction from which they were generated may be retired. The results may also be written back into a memory hierarchy, including one or more levels of cache memory as well as a system memory, e.g., by executing store instructions. In the embodiment shown, instruction results are stored in architected registers 206 during a non-interruptible time window during execution of an instruction, which may occur subsequently to the interruptible time window. Writing instruction results into the architected registers 206 may include transferring results from ones of the temporary registers 207 that were written thereto during the interruptible time window. Similarly, executing store instructions to write back results to globally observable memory, from the temporary registers, may also be performed during the non-interruptible window, using information written into the temporary registers during the interruptible window.

It is noted that while architected registers 206 and temporary registers 207 are illustrated here as two physically separate entities, the disclosure is not limited to such embodiments. For example, embodiments of a processor core utilizing a single file of physical registers and employing register renaming are possible and contemplated. In such embodiments, during the interruptible window, instruction results may be written to physical registers that are not currently associated with names of architected registers. When the instruction enters the non-interruptible window, the physical registers storing the results may be renamed from their temporary register names to appropriate architected register names. In this manner, the instruction results may be "transferred" to architected registers from temporary registers without actually moving the results from one physical register to another.

Cache subsystem 210 in the embodiment shown includes cache controller 211 and cache 212. Cache controller 211 in the embodiment shown may perform a number of different functions for operating and managing the cache subsystem 210. These functions include, but are not limited to, writing information to cache 212, reading information from cache 212, evicting/replacing cache lines, managing cache line status (e.g., valid, invalid, dirty, etc.), and so on. Although not explicitly shown, cache controller 211 may include a queue for storing information corresponding to incoming requests for access to cache 212, and may also include a buffer to provide temporary storage for information read from cache 212. Cache controller 211 also includes an arbitration circuit 221, which is configured to arbitrate among a number of received requests for access to cache 212. Various arbitration schemes may be used, such as credit-based arbitration. Furthermore, quality of service (QoS) parameters may be considered when arbitrating among competing cache access requests.

Processor core 205 in the embodiment shown is configured to receive interrupt requests from various sources, which include both hardware and software sources. The requests may be serviced by an interrupt handler executed by processor core 205. However, prior to beginning the servicing of the interrupt, processor core 205 must ensure certain actions have been performed. This includes ensuring cache subsystem 210 is clear of pending cache access requests, as well as ensuring that servicing the interrupt does not affect the architectural state of the system in a manner that could cause a functional error.

With regard to cache access requests, each request submitted by processor core 205 includes an indication as to whether the particular request is abandonable or non-abandonable. Requests may generally be classified as abandonable, as previously discussed, when their abandonment can be performed without affecting the functional correctness of the operation of system 200. This can include (but is not limited to) requests associated with instructions to be speculatively executed, prefetches, and so on. Non-abandonable requests are those requests that can affect the functional correctness of system operation, and whose completion may thus prevent occurrence of a system error.

In response to receiving an interrupt request, processor core 205 sends a signal ("Abandon") to cache controller 211 indicating that abandonable requests are to be dropped. In response to receiving this signal, cache controller 211 abandons pending requests that are designated as abandonable. Furthermore, control circuitry in cache controller 211 generates a signal ("Block Arb.") to arbitration circuit 221 to cause it to block any further arbitration for at least a portion of the time during which the interrupt is pending. Thus, cache controller 211 prevents any cache access requests from being conveyed into the cache pipeline during this time. It is noted that in some instances, arbitration may be allowed if necessary to service the interrupt. For example, in one embodiment, arbitration may be blocked for a fixed window of time after the Block Arb signal is received, but allowed thereafter, even if the interrupt has not been fully serviced. Cache controller 211 may complete any pending requests that were not designated as abandonable during this time. Upon marking all abandoned requests as abandoned, cache controller 211 provides a signal ("Acknowledge") to processor core 205.

As noted above, processor core 205 is configured to execute instructions that are temporally formatted into an interruptible time window and a non-interruptible time window. If an interrupt request is received during the interruptible window of a currently executing instruction, further execution may be suspended until the interrupt has been serviced. Any results generated from the instruction as executed thus far may be stored in temporary registers 207. If the interrupt request is received during the non-interruptible window, the currently executing instruction may be allowed to complete, with its results being committed to architected registers 206. It is noted that since processor core 205 may include multiple execution units, the operation described here for a single instruction may also apply to multiple instructions that may be executing concurrently. Thus, those instructions whose execution is still within the interruptible window at the time of the interrupt request may be suspended, while execution of instructions that had progressed to the non-interruptible window may be allowed to complete, including the committing of results generated thereby to architected registers 206.

Upon receiving the acknowledgment signal from cache controller 211 and either suspending or completing currently executing instructions, processor core 205 may begin execution of an interrupt handler to service the interrupt request. After completing the servicing of the interrupt, processor core 205 may provide another indication ("Interrupt Complete/Resume") to cache controller 211. In response to receiving this signal, and assuming the fixed window of time has not expired, cache controller 211 may release the block on arbitration circuit 221 and resume processing of cache access requests. Processor core 205 may also begin executing instructions upon completing servicing of the interrupt, including a resumption of execution for instructions that were suspended in response to the initial request.

The various techniques discussed above with reference to the systems of FIGS. 1 and 2 may reduce interrupt latency in many cases. The ability to abandon certain cache requests may free the cache resources for processing the interrupt request at an earlier time than would occur in the event that all pending requests had to be completed. Furthermore, limiting the non-interruptible window of an instruction to a small amount of time that occurs near the end of the instruction's execution may prevent delays that could otherwise occur if the instruction was required to execute to completion and retirement before the interrupt could be serviced. It is noted that these techniques may be implemented separately from one another in some embodiments, but are combinable in other embodiments.

Figure 3:
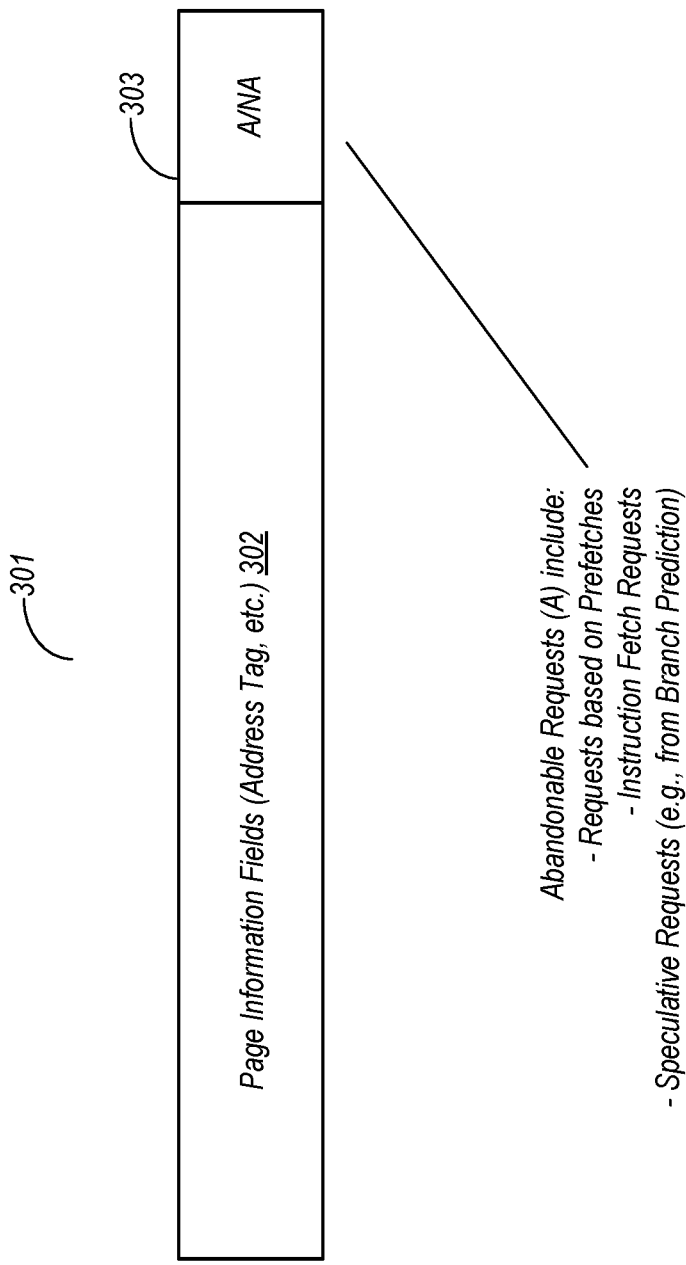
FIG. 3 is a diagram illustrating one embodiment of a format for a cache access request submitted to a cache subsystem.

Cache Request Access Format Example:

FIG. 3 is a diagram illustrating one embodiment of a format for a cache access request submitted to a cache subsystem. In the embodiment shown, cache request format 301 includes page information fields 302 and an abandonable indicator 303. The page information fields 302 may be subdivided into various subfields, including an address tag (e.g., corresponding to a virtual address of the requested line), read or write indication, and any other pertinent information for the particular request.

The abandonable indicator 303 in the embodiment shown indicates whether the particular request is abandonable in the event of receiving an interrupt request while it is still pending. If the request is based on one of a number of different types, it may be designated as abandonable. This may include requests associated with prefetches (e.g., from a stride prefetcher or other type), requests associated with instructions that are to be speculatively executed (e.g., in response to a branch prediction), requests for instructions to be executed at a later time, and so on. A cache access request may be designated as non-abandonable if completion of the request is necessary to maintain memory coherency, requests associated with instructions that are to be retired, and so on.

Figure 4:
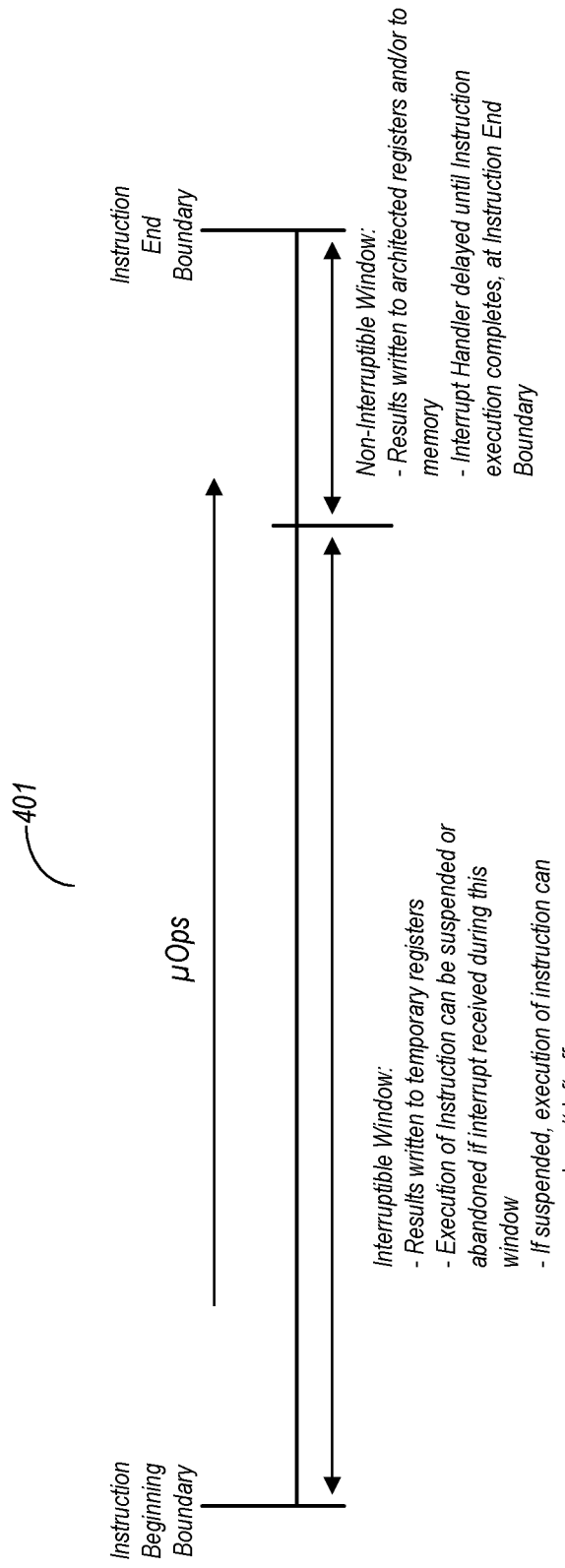
FIG. 4 is a diagram illustrating interruptible and non-interruptible windows of an instruction for one embodiment of a computer system.

Instruction Temporal Format Example:

FIG. 4 is a diagram illustrating the format, with respect to time, of instructions executed by one embodiment of a processor core as disclosed herein. In the embodiment shown, instruction format 401 includes an interruptible window of time and a non-interruptible window of time. The interruptible window begins at the beginning boundary of the instruction, and may consume a majority of the time that the instruction is in execution. The non-interruptible window follows the interruptible window, and consumes a smaller amount of time up to the instruction ending boundary.

Generally, instructions in this particular format may include a number of operations, sometimes referred to as micro-operations ("μOps"). Some of these operations may generate results that, when stored in architected registers, change the system's architectural state. Similarly, some instructions may include operations that generate results to be written back to globally observable memory. When these operations occur during the interruptible window, correspondingly generated results may be stored in temporary registers. If an interrupt request is received by the processor core during this interruptible window, execution of the instruction may be suspended, or in some cases, abandoned altogether. In the case where the instruction is suspended, its execution may be resumed after the interrupt has been serviced. Resumption of execution of the instruction may start from the point at which it was suspended.

The non-interruptible window of instruction format 401 in the embodiment shown is generally smaller than the interruptible window, and occurs toward the end of the instruction. Results generated during the execution of the instruction may be stored into the architected registers at this time. If the results were generated during the interruptible window, they may be transferred from temporary registers into architected registers, or alternatively, the physical registers in which they are stored may be renamed in accordance with a register renaming scheme. If the results stored in the temporary registers are intended to be committed to memory, they may be written thereto (e.g., by store operations) during the non-interruptible window. Processing of an interrupt request received during the non-interruptible window in the embodiment shown is delayed until the instruction completes execution, with its results committed to architected registers and/or memory and the instruction itself being ready for retirement.

It is noted that not all instructions executed by a processor core may conform to the format shown in FIG. 4. For example, instructions having only a single operation or a very small number of operations may be exempted from this format, as completion of such instructions does not have a significant impact on interrupt servicing latency. Some instructions may be atomic instructions having a requirement that, once execution has started, it cannot be interrupted until its execution is complete. Nevertheless, a significant number of instructions of the processor core's instruction set may be temporally formatted in the manner illustrated by FIG. 4, thereby allowing, during execution, suspension of the instruction during an interruptible window so as to allow reductions in the latency of interrupt handling.

Figure 5:
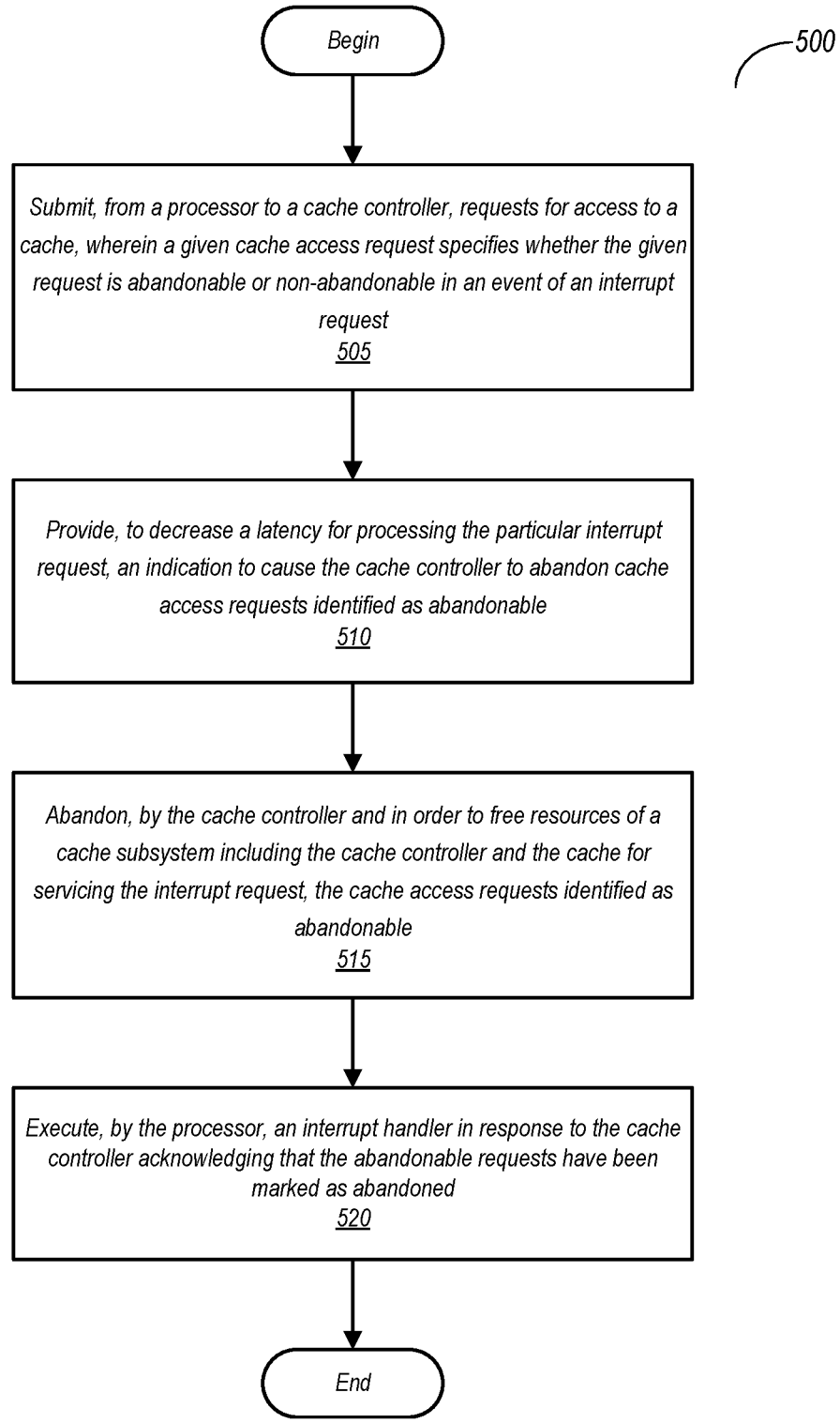
FIG. 5 is a flow diagram illustrating one embodiment of a method for operating a processor core and cache subsystem.

Methods for Operating a Processor Core for Reduced Interrupt Latency:

FIG. 5 is a flow diagram of one embodiment of a method for operating a processor core in conjunction with a cache subsystem to reduce interrupt latency. Method 500 may be performed with any variation of the hardware embodiments discussed above and in conjunction with other methods for reducing interrupt latency. Furthermore, embodiments of a computer system including circuitry capable of carrying out Method 500 that are not otherwise discussed herein are nevertheless considered to fall within the scope of this disclosure.

Method 500 includes submitting, from a processor to a cache controller, requests for access to a cache, wherein a given cache access request specifies whether the given request is abandonable or non-abandonable in an event of an interrupt request (block 505). The method further includes providing, to decrease a latency for processing the particular interrupt request, an indication to cause the cache controller to abandon cache access requests identified as abandonable (block 510). In response to the indication, the method continues with abandoning, by the cache controller and in order to free resources of a cache subsystem including the cache controller and the cache for servicing the interrupt request, the cache access requests identified as abandonable (block 515). The method then continues with executing, by the processor, an interrupt handler in response to the cache controller acknowledging that the abandonable requests have been marked as abandoned(block 520).

In various embodiments, the method includes providing, from the cache controller to the processor, an acknowledgment signal indicating the cache controller completing the marking as abandoned those cache access requests identified as abandonable. These embodiments may also include beginning execution of the interrupt handler, by the processor, in response to receiving the acknowledgment signal. Embodiments are further possible and contemplated wherein the cache access requests identified as abandonable include cache access requests corresponding to speculative instructions, cache access requests corresponding to prefetches, and cache access requests corresponding to instruction fetches.

In some embodiments, the method includes the processor executing particular instructions having an interruptible window, and a non-interruptible window subsequent to the interruptible window. The method further includes storing results of executing the particular instructions in temporary registers during the interruptible window and transferring the results of executing the particular instructions from the temporary registers into architected registers during the non-interruptible window. These embodiments of the method may also include suspending execution of a one of the particular instructions in response to receiving an interrupt request during the interruptible window and resuming execution of the one of the particular instructions in response to the processor completing servicing of the interrupt.

It is noted that the operation described in FIG. 5 may also apply to a memory subsystem. Accordingly, some memory requests may be designated as abandonable or non-abandonable. Those requests marked as abandonable may, in response to an indication from the processor core, be abandoned by a memory controller, while non-abandonable requests are carried out. Similarly, the memory controller may send an acknowledgement to the processor core in a manner similar to that performed by the cache controller. It is further noted that the operation may occur with both the cache controller and the memory controller, with abandonable requests for both cache access requests and memory requests being abandoned in an effort to reduce interrupt latency. Accordingly, "memory subsystem," "memory controller," "memory," and "memory requests" may be substituted for "cache subsystem," "cache controller," "cache memory," and "cache access requests," respectively wherein Method 500 is concerned.

Figure 6:
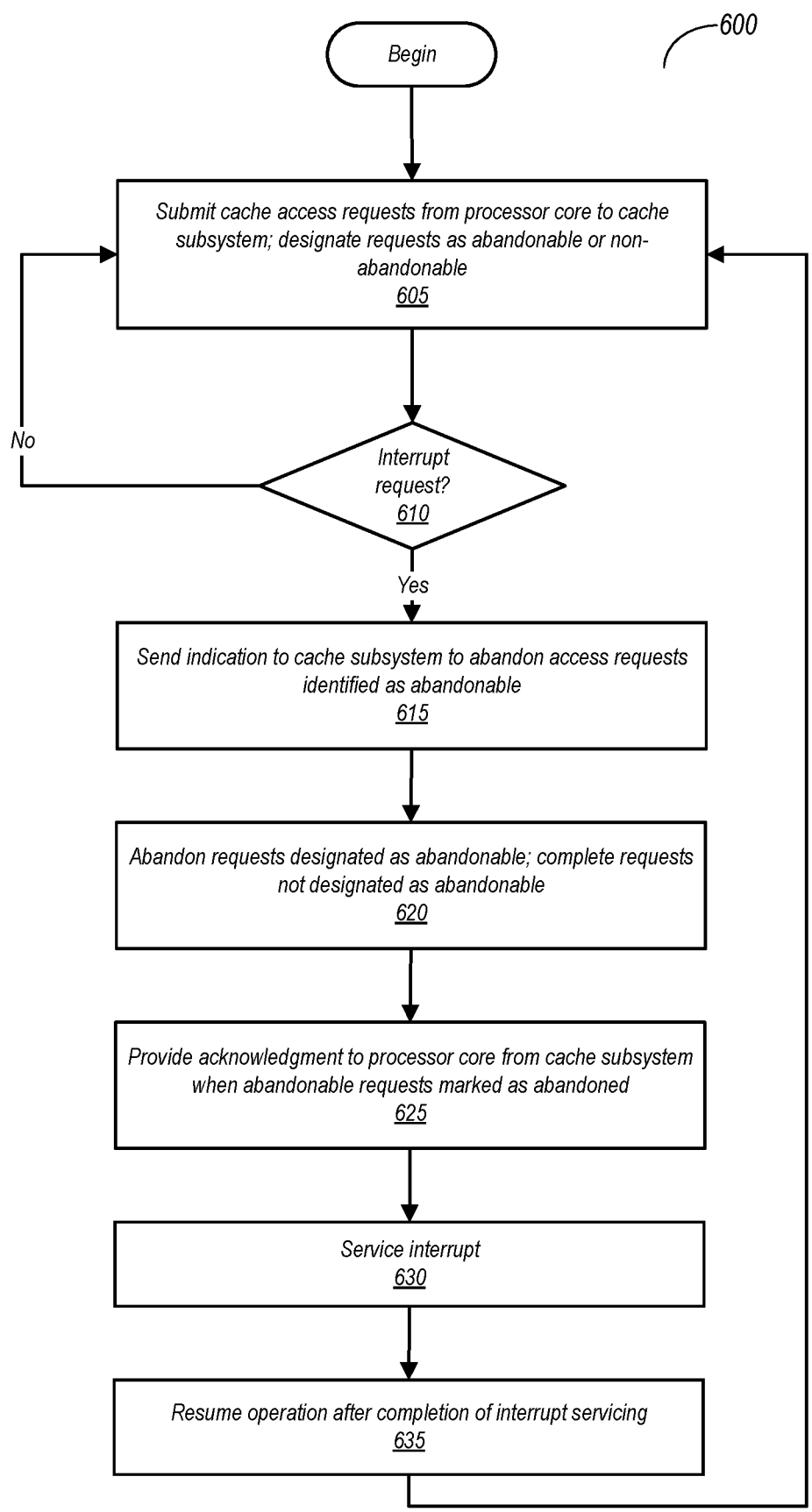
FIG. 6 is a flow diagram illustrating another embodiment of a method for operating a processor core and a cache subsystem.

FIG. 6 is a flow diagram of another embodiment of a method for operating a processor and cache subsystem to reduce interrupt latency. As with Method 500, Method 600 may be performed with various hardware embodiments discussed herein. The scope of the disclosure further includes hardware embodiments capable of carrying out Method 600, even if such embodiments are not otherwise explicitly discussed in this specification.

Method 600 includes submitting cache access requests from a processor core to a cache subsystem, with designation of the requests as abandonable or non-abandonable (block 605). In the absence of an interrupt request (block 610, no), Method 600 loops back to block 605, with cache access requests continuing to be submitted as needed. If an interrupt request occurs (block 610, yes), the processor core sends an indication to the cache subsystem to abandon access requests identified as abandonable (block 615). In response to receiving the indication, the cache subsystem abandons requests designated as abandonable and completes requests not designated as abandonable (block 620). the cache subsystem provides an acknowledgment to processor core from cache subsystem when all abandonable requests have been marked as abandoned (block 625). Upon receiving the acknowledgment from the cache subsystem, the processor core may then begin servicing the interrupt (block 630). After the interrupt has been serviced, normal operation may resume, and the processor core may once again begin submitting cache access requests, with Method 600 returning to block 605.

It is noted that embodiments are possible and contemplated in which requests marked as abandoned can fall into two different categories that are handled differently. The first category may include abandoned requests that have not made any transaction beyond the cache subsystem. Such requests may be safely removed and resources associate with these requests may be freed up immediately. Requests of a second category are those that for which a request has been sent from the cache subsystem to other parts of the system. Requests of this category cannot be fully abandoned until a response has come back from the system to the cache controller. However, since these requests have been marked as abandoned (and are to be fully abandoned upon receiving the system response), they can be marked as abandoned so as to not delay the beginning of interrupt handling.

It is further noted that, similar to Method 500 illustrated in FIG. 5, Method 600 as illustrated in FIG. 6 and discussed herein may be adapted to a memory subsystem, including a memory controller and a memory. Accordingly, "memory subsystem," "memory controller," "memory," and "memory requests" may be substituted for "cache subsystem," "cache controller," "cache memory," and "cache access requests," respectively wherein Method 600 is concerned.

Figure 7:
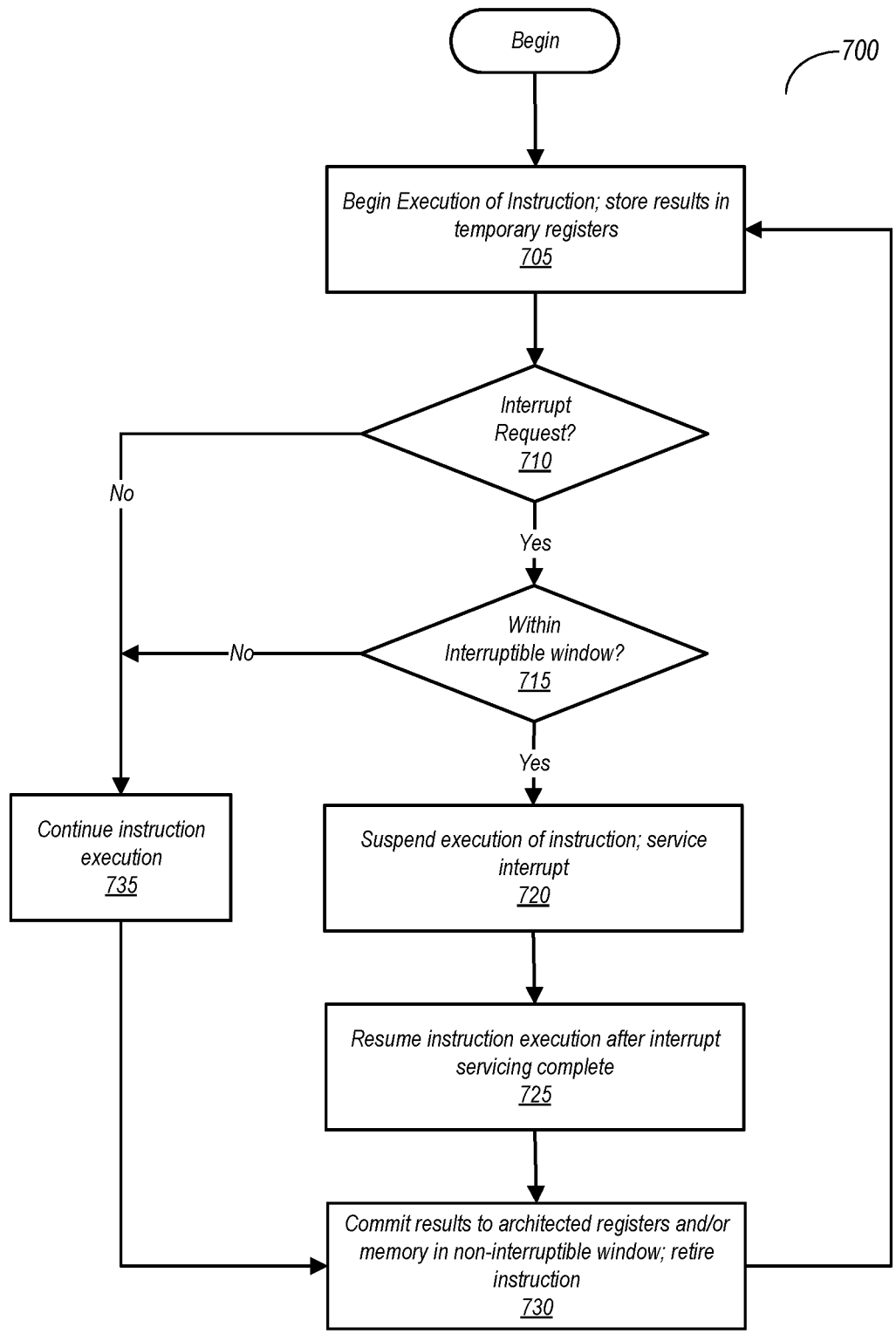
FIG. 7 is a flow diagram illustrating one embodiment of a method for operating a processor core.

FIG. 7 is a flow diagram of another method for operating a processor core to reduce interrupt latency. Method 700, similar to the other methods discussed above, may be performed using various hardware embodiments in accordance with this disclosure. It is further contemplated that other hardware embodiments not explicitly discussed herein that may also be capable of carrying out Method 700. Such embodiments are also considered to fall within the scope of this disclosure. It is further noted that Method 700 and variations thereof may be combined with embodiments of Methods 500 and 600 as discussed above, and thus hardware embodiments capable of carrying a combination of Method 600 with variations of Methods 500 and/or 600 also fall within the scope of this disclosure.

Method 700 starts with the beginning of execution, by a processor core, of an instruction, and storing any results generated thereby in temporary registers (block 705). The temporary registers are non-architected registers, and thus the updated results are, at the time of their storage, invisible to software executing on the processor core. It is noted that the temporary registers may, in some embodiments, be part of a larger physical register file that is used in a register renaming scheme in which physical registers can be renamed to architected registers when it is time to make the results visible to software.

The instruction executed by the processor core according to the Method 700 includes an interruptible window of time that is followed by a non-interruptible window. If no interrupt request occurs during the execution of the instruction (block 710, no), the processor core continues execution of the instruction (block 735), and commits the results generated during the execution of the instruction to architected registers during the non-interruptible window, with the instruction subsequently retired (block 730).

If an interrupt request is received (block 710 yes), but the instruction is executing not within the interruptible window (block 715, no), the processor core continues execution of the instruction (block 735), committing the results to the architected registers and subsequently retiring the instruction (block 735).

If an interrupt request is received (block 710, yes) during the interruptible window (block 715, yes), the processor core suspends execution of the instruction and services the interrupt (block 720). The processor core may resume execution of the instruction after the interrupt servicing is complete (block 725). After the instruction execution has progressed to the non-interruptible window, the results generated thereby are committed to the architected registers or memory (e.g., in the case of store operations) and the instruction is subsequently retired.

As noted above, Method 700 may be carried out by various hardware embodiments discussed herein, as well as other embodiments not explicitly discussed herein. One possible hardware embodiment capable of carrying out Method 700 includes a processor core comprising a plurality of architected registers and a plurality of temporary registers. The processor core is configured to store results of executing a particular instruction in ones of the plurality of temporary registers during an interruptible time window of the particular instruction. The processor core is further configured to transfer results of executing the particular instruction from the ones of the plurality of temporary registers to ones of the plurality of architected registers (or to system memory) during a non-interruptible time window subsequent to the interruptible time window. In response to receiving an interrupt during the interruptible time window, the processor core is configured to suspend executing the particular instruction and begin executing an interrupt handler.

Figure 8:
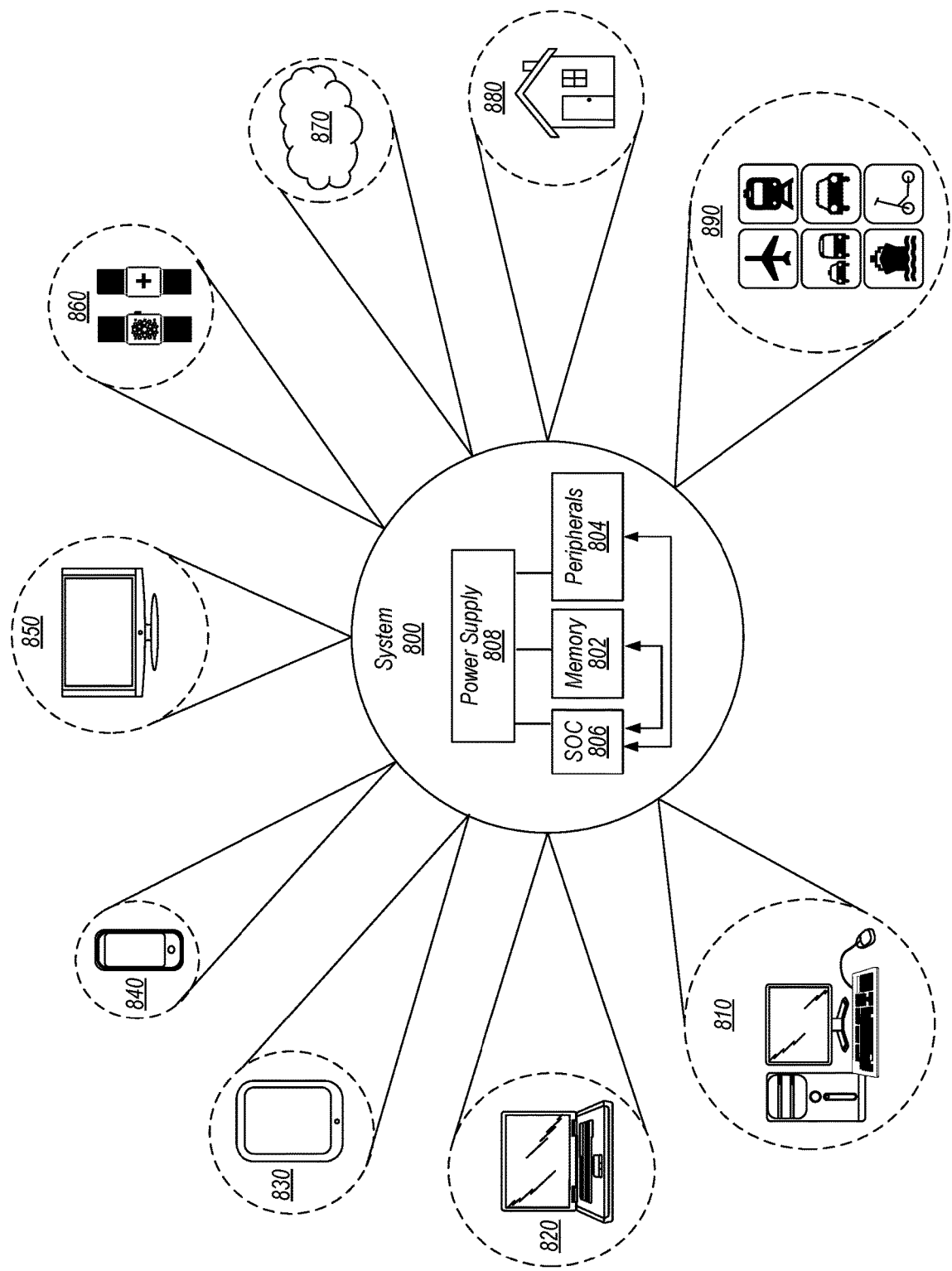
FIG. 8 is a block diagram of one embodiment of an example system.

Example System:

Turning next to FIG. 8, a block diagram of one embodiment of a system 800 is shown that may incorporate and/or otherwise utilize the methods and mechanisms described herein. In the illustrated embodiment, the system 800 includes at least one instance of a system on chip (SoC) 806 which may include multiple types of processing units, such as a central processing unit (CPU), a graphics processing unit (GPU), or otherwise, a communication fabric, and interfaces to memories and input/output devices. In some embodiments, one or more processors in SoC 806 includes multiple execution lanes and an instruction issue queue. In various embodiments, SoC 806 is coupled to external memory 802, peripherals 804, and power supply 808.

A power supply 808 is also provided which supplies the supply voltages to SoC 806 as well as one or more supply voltages to the memory 802 and/or the peripherals 804. In various embodiments, power supply 808 represents a battery (e.g., a rechargeable battery in a smart phone, laptop or tablet computer, or other device). In some embodiments, more than one instance of SoC 806 is included (and more than one external memory 802 is included as well).

The memory 802 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

SoC 806 in the embodiment shown may include the various mechanisms discussed above for reducing interrupt latency. Accordingly, SoC 806 may include one or more processor cores and correspondingly coupled cache subsystems in which some requests are designated as abandonable. When an interrupt occurs, the processor core may provide an indication of the same to the cache subsystem, which may respond by abandoning the designated requests. Additionally, the cache subsystem may block arbitration of additional requests, irrespective of their designation, for a fixed window of time. Requests not designated as abandonable, if pending, may be completed, and thereafter, an acknowledge signal is returned to the processor core, indicating that its resources are free for use in the interrupt handling. The processor core may then begin execution of an interrupt handler.

In addition to the above, a processor core in SoC 806 may also execute instructions having an interruptible window and a subsequent non-interruptible window. Results that can change the architectural state of the processor core may be temporarily stored in non-architected registers during the interruptible window. This may delay the changing of the architectural state. During the subsequent, non-interruptible window, the architectural state of the processor may be changed as the results are committed to architected registers, and the instruction may be subsequently retired. If an interrupt request is received during the interruptible window of the instruction, its execution may be suspended until interrupt handling is complete. Thereafter, execution of the instruction may resume, with the results committed to architected registers during the non-interruptible window.

The peripherals 804 include any desired circuitry, depending on the type of system 800. For example, in one embodiment, peripherals 804 includes devices for various types of wireless communication, such as Wi-Fi, Bluetooth, cellular, global positioning system, etc. In some embodiments, the peripherals 804 also include additional storage, including RAM storage, solid state storage, or disk storage. The peripherals 804 include user interface devices such as a display screen, including touch display screens or multi-touch display screens, keyboard or other input devices, microphones, speakers, etc.

As illustrated, system 800 is shown to have application in a wide range of areas. For example, system 800 may be utilized as part of the chips, circuitry, components, etc., of a desktop computer 810, laptop computer 820, tablet computer 830, cellular or mobile phone 840, or television 850 (or set-top box coupled to a television). Also illustrated is a smartwatch and health monitoring device 860. In some embodiments, smartwatch 860 may include a variety of general-purpose computing related functions. For example, smartwatch 860 may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 800 may further be used as part of a cloud-based service(s) 870. For example, the previously mentioned devices, and/or other devices, may access computing resources in the cloud (i.e., remotely located hardware and/or software resources). Still further, system 800 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 8 is the application of system 800 to various modes of transportation. For example, system 800 may be used in the control and/or entertainment systems of aircraft, trains, buses, cars for hire, private automobiles, waterborne vessels from private boats to cruise liners, scooters (for rent or owned), and so on. In various cases, system 800 may be used to provide automated guidance (e.g., self-driving vehicles), general systems control, and otherwise. These any many other embodiments are possible and are contemplated. It is noted that the devices and applications illustrated in FIG. 8 are illustrative only and are not intended to be limiting. Other devices are possible and are contemplated.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components. etc.) may be described or claimed as "configured" to perform one or more tasks or operations. This formulation— [entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured. to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing; the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus comprising:
   a processor core; and
   a cache subsystem having a cache and a cache controller coupled to the processor core, wherein the processor core is configured to submit, to the cache controller, requests for access to the cache, wherein a given request for access to the cache specifies whether the given request is abandonable or non-abandonable in an event of an interrupt request;
   wherein, in response to a particular interrupt request, the processor core is configured to decrease a latency for processing the particular interrupt request by providing an indication to cause the cache controller to abandon requests for access to the cache identified as abandonable, and wherein upon abandonment of requests identified as abandonable, cache subsystem resources associated with the requests identified as abandonable are freed for use in servicing the interrupt request; and
   wherein the processor core is configured to begin execution of an interrupt handler for handling the particular interrupt request in response to the cache controller acknowledging that the requests identified as abandonable have been marked as abandoned.

2. The apparatus of claim 1, wherein the cache controller is configured to provide an acknowledgment signal to the processor core indicating that any pending abandonable requests have been marked as abandoned.

3. The apparatus of claim 2, wherein the processor core is configured to begin execution of the interrupt handler in response to receiving the acknowledgement signal.

4. The apparatus of claim 1, wherein the cache controller is further configured to block arbitration of requests for access to the cache in response to receiving the indication from the processor core.

5. The apparatus of claim 1, wherein the processor core includes a plurality of architected registers and a plurality of temporary registers, wherein, within an interruptible time interval during execution of a particular instruction, the processor core is configured to store results of executing the particular instruction in ones of the plurality of temporary registers.

6. The apparatus of claim 5, wherein, during a non-interruptible time interval subsequent to the interruptible time interval, the processor core is configured to transfer the results of executing the particular instruction from the ones of the plurality of temporary registers to ones of the plurality of architected registers.

7. The apparatus of claim 5, wherein, in response to receiving an interrupt request during the interruptible time interval of the particular instruction, the processor core is configured to suspend execution of the particular instruction until execution of the interrupt handler is complete.

8. The apparatus of claim 1, wherein the processor core is configured to identify cache access requests corresponding to speculative instructions as abandonable.

9. The apparatus of claim 1, wherein the processor core is configured to identify cache access requests corresponding to prefetches as abandonable.

10. The apparatus of claim 1, wherein the processor core is configured to identify cache access requests corresponding to instruction fetches as abandonable.

11. A method comprising:
   submitting, from a processor to a cache controller, requests for access to a cache, wherein a given cache access request specifies whether the given request is abandonable or non-abandonable in an event of an interrupt request;
   providing, to decrease a latency for processing a particular interrupt request, an indication to cause the cache controller to abandon cache access requests identified as abandonable;
   abandoning, by the cache controller and in order to free resources of a cache subsystem including the cache controller and the cache for servicing the interrupt request, the cache access requests identified as abandonable; and executing, by the processor, an interrupt handler in response to the cache controller acknowledging that the abandonable requests have been marked as abandoned.

12. The method of claim 11, further comprising:

providing, from the cache controller to the processor, an acknowledgment signal indicating the cache controller marking as abandoned the cache access requests identified as abandonable; and beginning execution of the interrupt handler, by the processor, in response to receiving the acknowledgment signal.

13. The method of claim 11, wherein the cache access requests identified as abandonable include:

cache access requests corresponding to speculative instructions;

cache access requests corresponding to prefetches; and cache access requests corresponding to instruction fetches.

14. The method of claim 11, further comprising the processor executing particular instructions having an interruptible window and a non-interruptible window subsequent to the interruptible window, and wherein executing the particular instructions includes:

storing results of executing the particular instructions in temporary registers during the interruptible window; and transferring the results of executing the particular instructions from the temporary registers into architected registers during the non-interruptible window.

15. The method of claim 14, further comprising:

suspending execution of a one of the particular instructions in response to receiving an interrupt request during the interruptible window; and resuming execution of the one of the particular instructions in response to the processor completing servicing of the interrupt.

16. A system comprising:

a processor core configured to submit memory access requests, wherein selected ones of the memory access requests are indicated as being abandonable in response to the processor core receiving an interrupt request; and a memory subsystem having a memory controller and a memory, wherein the memory subsystem is configured to receive the memory requests from the processor core;

wherein, in response to an interrupt request, the processor core is configured to provide an indication to the memory subsystem to abandon the selected ones of the memory requests that are indicated as being abandonable, and wherein upon abandonment of memory requests identified as abandonable, memory subsystem resources associated with the requests identified as abandonable are freed for use in servicing the interrupt request; and wherein the processor core is configured execute an interrupt handler to service the particular interrupt request in response to the memory subsystem providing an acknowledgement of marking as abandoned the memory requests that were indicated as abandonable.

17. The system of claim 16, wherein the processor core includes a plurality of temporary registers and a plurality of architected registers, wherein the processor core is configured to, during an interruptible time window of a particular instruction, store results of executing the particular instruction in ones of a plurality of temporary registers, and wherein the processor core is further configured to transfer the results of executing the particular instruction to ones of the architected registers during a non-interruptible time window of the particular instruction following the interruptible time window.

18. The system of claim 17, wherein the processor core is further configured to:

suspend execution of the particular instruction in response to receiving an interrupt request during the interruptible time window; and resume execution of the particular instruction in response to completing servicing of the interrupt request.

19. The system of claim 16, wherein in response to receiving the indication from the processor core, the memory subsystem is configured to block arbitration for further memory requests.

20. The system of claim 16, wherein the memory subsystem is configured to provide an acknowledgment signal to the processor core in response to marking as abandoned the memory requests that were indicated as abandonable, wherein the processor core is configured to begin servicing the interrupt in response to receiving the acknowledgment signal, and wherein the processor core is configured to provide an indication to cause resumption of operation upon completing servicing of the memory request.

* * * * *